(12) United States Patent
Madrigal et al.

(10) Patent No.: US 12,258,130 B2
(45) Date of Patent: Mar. 25, 2025

(54) AUXETIC ENERGY ABSORBING PASSENGER SAFETY ASSEMBLIES

(71) Applicant: Safran Seats USA LLC, Gainesville, TX (US)

(72) Inventors: Jose Madrigal, Chihuahua (MX); Mario Herrera, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 240 days.

(21) Appl. No.: 17/632,234

(22) PCT Filed: Aug. 29, 2019

(86) PCT No.: PCT/US2019/048791
§ 371 (c)(1),
(2) Date: Feb. 1, 2022

(87) PCT Pub. No.: WO2021/040716
PCT Pub. Date: Mar. 4, 2021

(65) Prior Publication Data
US 2022/0267009 A1    Aug. 25, 2022

(51) Int. Cl.
*B60N 2/42* (2006.01)
*B60N 2/427* (2006.01)
*B64D 11/06* (2006.01)

(52) U.S. Cl.
CPC ............ *B64D 11/0619* (2014.12); *B60N 2/42* (2013.01); *B60N 2/4221* (2013.01); *B60N 2/42745* (2013.01)

(58) Field of Classification Search
CPC .... B60N 2/42; B60N 2/4221; B60N 2/42745; B64D 11/0619
See application file for complete search history.

(56) References Cited

U.S. PATENT DOCUMENTS

| 3,744,818 | A | * | 7/1973 | Sandberg | B60R 21/02 280/752 |
| 3,877,749 | A | * | 4/1975 | Sakurai | B60N 2/4256 297/216.14 X |
| 3,930,665 | A | * | 1/1976 | Ikawa | B60R 21/045 293/133 |

(Continued)

FOREIGN PATENT DOCUMENTS

| CN | 107338572 B | 7/2019 |
| EP | 1612108 A1 | 1/2006 |

(Continued)

OTHER PUBLICATIONS

International Patent Application No. PCT/US2019/048791, International Search Report and Written Opinion, dated Jun. 2, 2020.

(Continued)

*Primary Examiner* — Rodney B White
(74) *Attorney, Agent, or Firm* — Kilpatrick Townsend & Stockton LLP

(57) ABSTRACT

Described are energy absorbing assemblies for a passenger seat. The energy absorbing assemblies can include one or more auxetic energy absorbing elements (130), each element including a crushable matrix formed of cells having an auxetic cell geometry that are crushable in a direction of energy capture.

20 Claims, 9 Drawing Sheets

(56) References Cited

U.S. PATENT DOCUMENTS

| | | | | |
|---|---|---|---|---|
| 4,252,341 | A * | 2/1981 | Barecki | B60N 2/4249 280/751 X |
| 4,335,918 | A * | 6/1982 | Cunningham | B60N 2/4221 297/216.14 X |
| 4,898,426 | A * | 2/1990 | Schulz | B64D 11/0649 297/445.1 |
| 5,224,755 | A * | 7/1993 | Beroth | B64D 11/06 297/216.1 X |
| 5,340,059 | A * | 8/1994 | Kanigowski | B64D 25/00 280/752 |
| 5,482,230 | A * | 1/1996 | Bird | B64C 1/10 244/121 |
| 5,580,124 | A * | 12/1996 | Dellanno | B60N 2/803 297/216.12 |
| 5,649,721 | A * | 7/1997 | Stafford | B64D 25/00 280/751 |
| 5,769,489 | A * | 6/1998 | Dellanno | B60N 2/42709 297/216.12 |
| 5,816,659 | A * | 10/1998 | Wolf | B60N 2/24 297/452.1 |
| 5,836,547 | A * | 11/1998 | Koch | B64D 25/04 297/216.12 |
| 6,003,937 | A * | 12/1999 | Dutton | B60N 2/42709 297/216.13 |
| 6,062,642 | A * | 5/2000 | Sinnhuber | B60N 2/4279 297/216.13 |
| 6,142,563 | A * | 11/2000 | Townsend | B60N 2/4228 297/216.13 |
| 6,186,582 | B1 * | 2/2001 | Beckmann | B60R 13/02 296/187.05 |
| 6,733,064 | B2 * | 5/2004 | Fox | B60R 21/045 296/187.05 |
| 6,896,324 | B1 * | 5/2005 | Kull | B64D 11/0689 297/216.13 |
| 7,021,706 | B2 * | 4/2006 | Aufrere | B60N 2/42745 297/216.13 X |
| 7,160,621 | B2 * | 1/2007 | Chaudhari | B60R 19/18 293/122 |
| 7,597,393 | B1 * | 10/2009 | Tuccinardi | B60R 11/0211 297/217.3 |
| 7,810,881 | B2 * | 10/2010 | Beneker | B60N 2/42709 297/216.16 |
| 7,850,247 | B2 * | 12/2010 | Stauske | B60N 2/72 297/452.52 |
| 7,959,226 | B2 * | 6/2011 | Hattori | B60R 11/0235 297/217.3 X |
| 9,114,773 | B2 * | 8/2015 | Sundararajan | B60R 21/0428 |
| 9,415,708 | B2 * | 8/2016 | Cormier | B60N 2/70 |
| 9,487,157 | B1 * | 11/2016 | Vinton | B60R 11/0235 |
| 9,845,029 | B1 * | 12/2017 | Dry | B60N 2/42 |
| 10,059,423 | B2 * | 8/2018 | Smithson | B64D 11/00 |
| 10,195,969 | B2 * | 2/2019 | Veine | B60N 2/64 |
| 10,214,291 | B2 * | 2/2019 | Ferguson | B60N 2/4242 |
| 10,479,246 | B2 * | 11/2019 | Meingast | B60N 2/7017 |
| 10,507,922 | B2 * | 12/2019 | Natsume | B64D 11/0619 |
| 10,525,899 | B2 * | 1/2020 | Mullen | B60R 11/0235 |
| 10,953,810 | B2 * | 3/2021 | Hernandez | B64D 11/0619 |
| 11,040,636 | B2 * | 6/2021 | Hosbach | B60N 2/005 |
| 11,220,765 | B2 * | 1/2022 | Jayasuriya | D03D 1/0005 |
| 11,407,342 | B1 * | 8/2022 | Norton | B60N 2/42745 |
| 11,603,019 | B2 * | 3/2023 | Jost | B60N 2/4228 |
| 2004/0007906 | A1 * | 1/2004 | Park | B60N 2/879 297/217.3 |
| 2010/0001479 | A1 * | 1/2010 | Trybus | B60N 2/42718 297/452.48 |
| 2010/0001568 | A1 * | 1/2010 | Trybus | B62D 43/10 297/312 |
| 2011/0298267 | A1 * | 12/2011 | Yamaki | B60N 2/4228 297/391 |
| 2011/0316311 | A1 * | 12/2011 | Westerink | B64D 11/00151 297/217.3 |
| 2012/0013108 | A1 * | 1/2012 | Yamaki | B60N 2/68 297/216.1 X |
| 2012/0068506 | A1 * | 3/2012 | Yamaki | B60N 2/4235 297/216.1 |
| 2012/0091766 | A1 * | 4/2012 | Yamaki | B60N 2/4235 297/216.1 |
| 2012/0098305 | A1 * | 4/2012 | Yamaki | B60N 2/682 297/216.14 |
| 2012/0223565 | A1 * | 9/2012 | Yasui | B60N 2/682 297/452.1 |
| 2013/0009430 | A1 * | 1/2013 | Islam | B60R 21/16 297/216.1 X |
| 2015/0202999 | A1 * | 7/2015 | Jafri | B64D 11/0015 297/216.12 |
| 2015/0320220 | A1 * | 11/2015 | Eberlein | A47C 3/00 297/452.18 |
| 2015/0321591 | A1 * | 11/2015 | Kuhley | B60N 2/682 264/261 |
| 2016/0214518 | A1 * | 7/2016 | Ter Steeg | B60N 2/682 |
| 2018/0265023 | A1 | 9/2018 | Faruque et al. | |
| 2019/0084452 | A1 * | 3/2019 | Hagedorn | B32B 27/306 |
| 2020/0079510 | A1 * | 3/2020 | Natsume | B64D 11/0646 |
| 2022/0234483 | A1 * | 7/2022 | Tate Morgan | B60N 2/686 |
| 2022/0242289 | A1 * | 8/2022 | Nagwanshi | B60N 2/686 |
| 2023/0302983 | A1 * | 9/2023 | Lloyd | B60N 2/24 297/216.12 |
| 2023/0331128 | A1 * | 10/2023 | Mansouri | B60N 2/70 |

FOREIGN PATENT DOCUMENTS

| | | | | |
|---|---|---|---|---|
| EP | | 3492254 A1 | 6/2019 | |
| WO | WO-2020127810 A1 * | | 6/2020 | B60N 2/0284 |

OTHER PUBLICATIONS

EP Appl. No. 19768946.6, Office Action, Nov. 27, 2023, 5 pages.

* cited by examiner

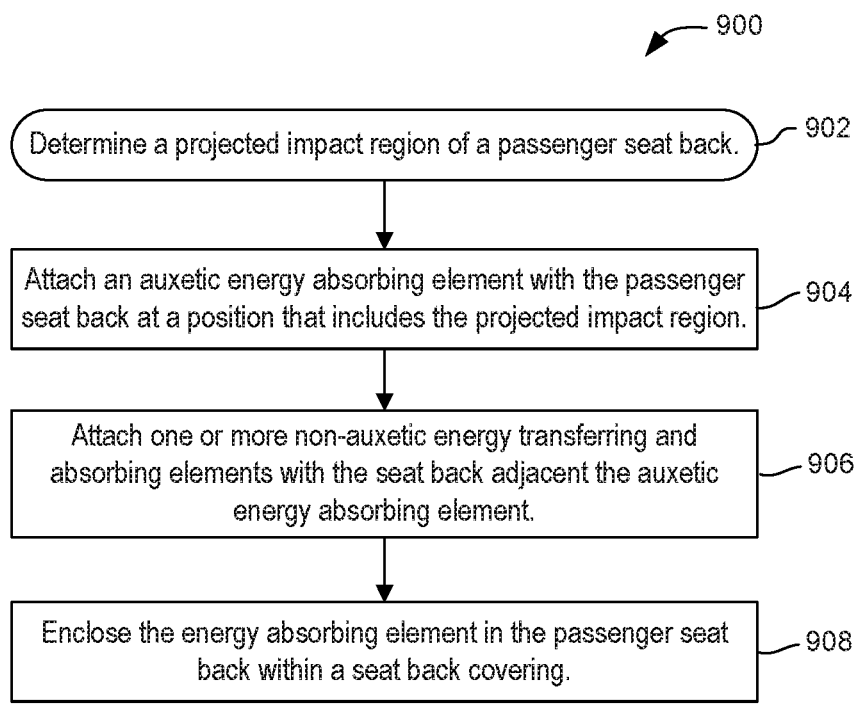

AUXETIC ENERGY ABSORBING PASSENGER SAFETY ASSEMBLIES

CROSS-REFERENCE TO RELATED APPLICATIONS

This application is a national stage application of International Patent Application PCT/US2019/048791, filed on Aug. 29, 2019 and titled AUXETIC ENERGY ABSORBING PASSENGER SAFETY ASSEMBLIES, the content of which is hereby incorporated by reference in its entirety.

FIELD OF THE INVENTION

The field of the invention relates to energy absorbing features for improving passenger safety.

BACKGROUND

In commercial aircraft, seats are designed to meet the needs of passenger safety and comfort, while accounting for strict limitations on weight and space. In existing aircraft designs, passenger seats are designed with rigid supportive structures to meet safety criteria, with combinations of heavy foam cushioning, collapsible structures, and restraints to provide support for passengers and to protect passengers against injury in the event of emergency landings, turbulence, or other deceleration events. One of the most important safety metrics is head-impact criteria (HIC), i.e., the measure of the likelihood of head injury arising from impact. As added weight reduces aircraft efficiency, improved solutions for passenger seating that focus on improving HIC safety without adding weight are desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an energy absorbing assembly for a passenger seat can include an energy absorbing element connectible with a first passenger seat and configured for placement forward of a second passenger seat. The energy absorbing element can include a crushable matrix having a plurality of cells characterized by an auxetic cell geometry that are crushable in a direction of energy capture. The crushable matrix can include portions that are non-auxetic, as well as varying cross-sectional areas of the plurality of cells that can tune energy transfer through the crushable matrix.

According to certain embodiments of the present invention, a passenger seat can include a frame, a seat back connected with the frame, and an energy absorbing element connected with and positioned within or on an aft side of the seat back, preferably within a shroud or cover of the passenger seat back. The energy absorbing element can include a crushable matrix formed of a plurality of cells characterized by an auxetic cell geometry that are crushable in a direction of energy capture.

According to certain embodiments of the present invention, a method of installing an energy absorbing assembly in a passenger seat can include connecting an energy absorbing element as described herein with a seat back at a position that includes a projected impact region. The projected impact region comprising a portion of the seat back at which a passenger located behind the passenger seat might impact during a deceleration event.

BRIEF DESCRIPTION OF THE DRAWINGS

FIG. 9 illustrates an example process for installing an auxetic energy absorbing element in a passenger seat, in accordance with various embodiments.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide energy absorbing safety features, and specifically auxetic energy absorbing assemblies, for passenger seats. While the auxetic energy absorbing assemblies are discussed for use with aircraft seats, they are by no means so limited. Rather, embodiments of the auxetic energy absorbing assemblies may be used in passenger seats or other seats of any type or otherwise as desired.

The term "auxetic" as applied herein refers to materials, mesh, or grids at least partially composed of cells having an auxetic geometry. Such cells, when subjected to a compressive force in one direction, will tend to compress in an orthogonal direction, as opposed to non-auxetic cells that tend to expand in the orthogonal direction when compressed. This phenomenon is also referred to as having a negative Poisson's ratio. Similarly, when auxetic cells are subjected to pulling in one direction, they will tend to also expand in the orthogonal direction. In bulk, auxetic materials, mesh, and grids formed from many cells tend to exhibit the same phenomenon.

In specific embodiments, auxetic energy absorbing elements can be assembled with passenger seats, particularly into passenger seat backs, and positioned in an impact region where a passenger behind the seat would likely impact in the event of sudden deceleration. Auxetic energy absorbing elements can be concealed in the shroud or covering of an aircraft seat and remain effective at absorbing kinetic energy while crushing, and provide a substantial improvement over cushioning or other, conventional energy absorption strategies; and may be used in conjunction with other safety features. In particular, energy absorbing elements can improve head impact safety criteria (HIC) compliance, without adding significant weight or complexity to the passenger seat assembly as a whole.

Figure 1:
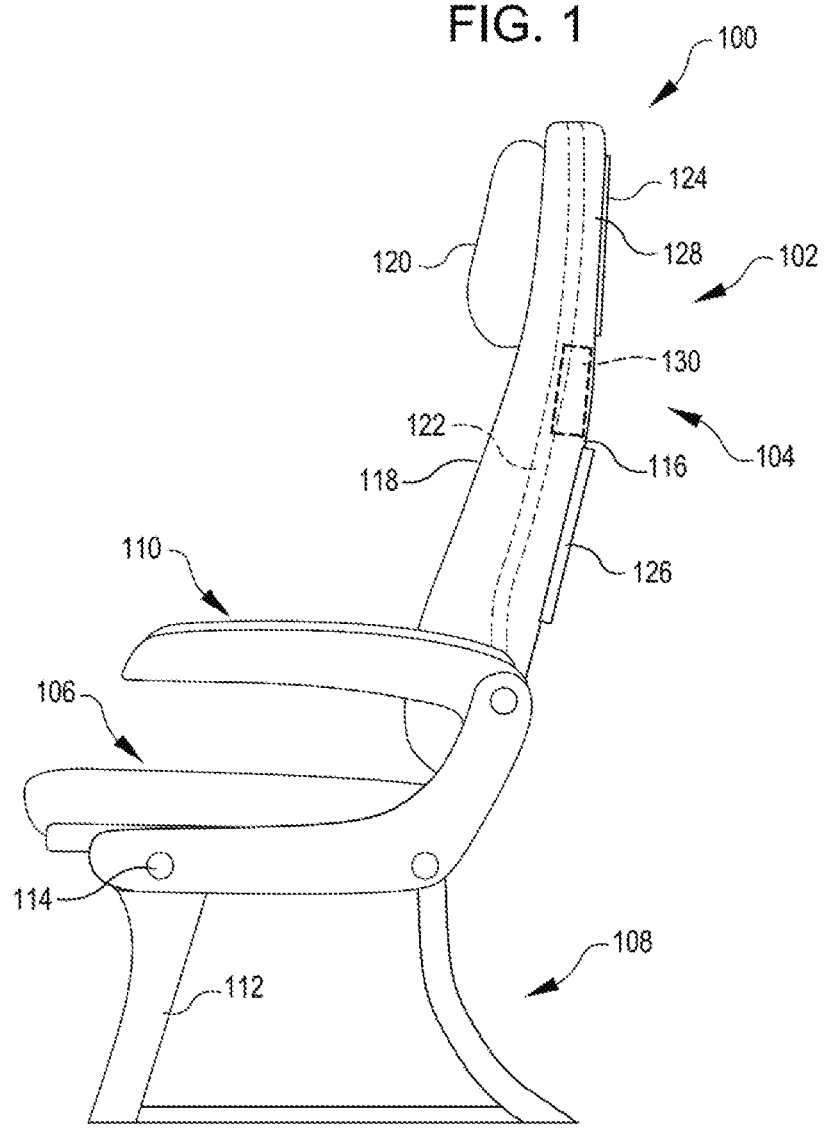
FIG. 1 is a simplified side section view of a first example of a passenger seat having an auxetic energy absorbing element, in accordance with various embodiments.

FIG. 1 is a simplified side section view of a first example of a passenger seating arrangement 100 having a passenger seat 102 with an auxetic energy absorbing element 130, in accordance with various embodiments. The passenger seat 102 may be positionable in an array of passenger seats, typically multiple seats to a row and multiple rows, with the passenger seat positioned in front of a second passenger seat containing a passenger. The passenger seat 102 includes a seat back 104, seat bottom 106, and armrests 110 supported by a frame 108; and multiple passenger seats in a row may be supported by a set of supportive tubes 114 and a common set of seat frame struts 112.

The seat back 104 can include a seat back inner frame 122 which supports a seat back shroud 116 on an aft side and a seat back cushion 118 and headrest 120 on a forward side for supporting a passenger. The seat back shroud 116 can be formed to enclose the seat back 104, to secure any passenger amenities installed therein, and to provide a smooth protective surface for the protection of passengers behind the seat 102. Some passenger amenities that can be secured in the seat back shroud 116 may include a media device 124 (e.g., a screen configured to play media or to provide a passenger with information) and a tray table assembly 126. A wide variety of seat configurations and attached amenities are possible, and can be accommodated by an appropriately shaped seat back shroud 116.

In accordance with various embodiments, at least an upper portion 128 of the seat back shroud 116 can contain the auxetic energy absorbing element 130. The specific location of the auxetic energy absorbing element 130 in the seat back 104 can be selected based on the geometry of the seating arrangement 100 to which the seat 102 belongs, and is preferably selected to match a location on the seat back 104 at which a passenger seated aft of the seat would first collide in the event of a severe deceleration event. In at least one embodiment, the auxetic energy absorbing element is placed between the position of a stowed tray table assembly 126 and the position of a media device 124. In some other embodiments, taking as a reference point tray table assembly 126, which could be a single leaf or bi-fold table, the auxetic energy absorbing element 130 can be positioned adjacent the table in a vertical direction. For certain standard seat assembly configurations, positioning the auxetic energy absorbing element 130 adjacent the tray table assembly 126 can mean positioning the energy absorbing element within a height range of 75 to 90 cm using as a reference the point of contact of the passenger seat 102 with a cabin floor.

According to some embodiments, the auxetic energy absorbing element 130 is positioned within seat back shroud 116, which may be a shell-like enclosure formed of a suitable polymer, composite, or lightweight metal body that is sufficiently pliable to bend or crush under loading during a sudden deceleration event, thus transferring impact forces to the auxetic energy absorbing element 130 therein. In some embodiments, the auxetic energy absorbing element 130 can also be positioned in a soft or pliable cladding, such as a textile or flexible polymer shell, and positioned on an exterior of the seat back shroud.

The specific geometry of the auxetic energy absorbing element 130 may be modified to accommodate other seat structures, such as the media device 124 and tray table assembly 126, and may be multiple elements that are distributed throughout parts of the seat back 104. Specific configurations of the auxetic energy absorbing element 130, and alternative configurations of auxetic energy absorbing elements, are shown with reference to FIGS. 2-4.

Figure 2:
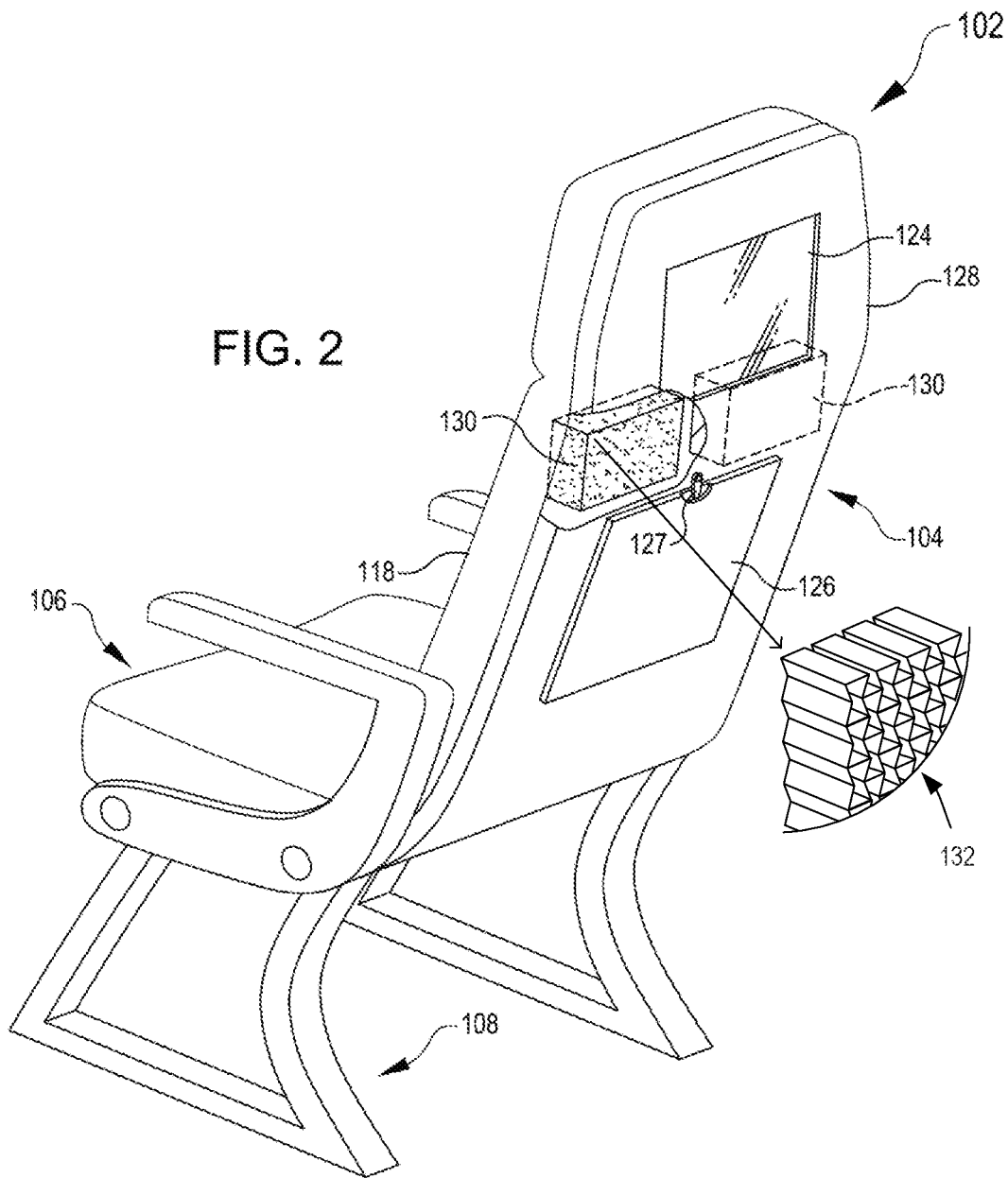
FIG. 2 is a simplified perspective view of the passenger seat shown in FIG. 1, with emphasis on the positioning of the energy absorbing element.

FIG. 2 is a simplified perspective view of the passenger seat 102 shown in FIG. 1, with emphasis on the positioning of the auxetic energy absorbing element 130. The auxetic energy absorbing element 130 is positioned within the seat back shroud 116, and within an upper portion 128 thereof, between an upper extent of the tray table assembly 126 and the media device 124. The positioning may be the same for seats that lack a tray table or media device. The auxetic energy absorbing element be split into multiple parts and distributed throughout a portion of the seat back 104 that aligns with the potential path of a passenger during a severe deceleration event. In one example, the auxetic energy absorbing element 130 is split to pass around seat components, such as a tray table locking assembly 127.

The auxetic energy absorbing element 130 can be formed of a crushable material formed in an open grid, with a repeating cellular structure 132 that forms any suitable auxetic pattern as discussed herein. In some embodiments, the auxetic pattern can be a repeating reentrant hexagonal shape (i.e., a reentrant hexagonal parallelagon shape, or bowtie shape), but alternative auxetic patterns may be used. In at least one embodiment, the auxetic energy absorbing element 130 can be a longitudinally extended auxetic grid. The orientation of the auxetic energy absorbing element 130 can be substantially horizontal, meaning, the orientation of a long axis passing through the auxetic cells may be substantially horizontal, or orthogonal to the seat back 104. However, in some embodiments, the auxetic energy absorbing element may be rotated, and positioned in a substantially vertical orientation. In some embodiments, the auxetic energy absorbing element may include one or more panels covering the openings along either one, or both, ends thereof. The size of the individual cells in the repeating cellular structure 132 of the auxetic energy absorbing element 130 may vary depending on the specific form of cellular structure, the desired crush strength, the material selected, and other factors; but in some embodiments, the repeating cell structure can have a cell size of 1 mm to 10 mm, preferably from 5 mm to 10 mm (with reference to the long dimension of a bowtie-shaped auxetic geometry). The auxetic and non-auxetic energy absorbing elements described herein can be formed by methods including, but not limited to, injection molding, extrusion, or 3D printing. In some other embodiments, the auxetic energy absorbing element can be an auxetic foam. One method for inducing an auxetic microstructure in a foam is by a combination of compressing the foam while heating the foam to a temperature band above the foam's softening point. This process mechanically modifies the normally convex cell structure into a re-entrant cell structure, thus embedding auxetic properties in the foam.

Figure 3:
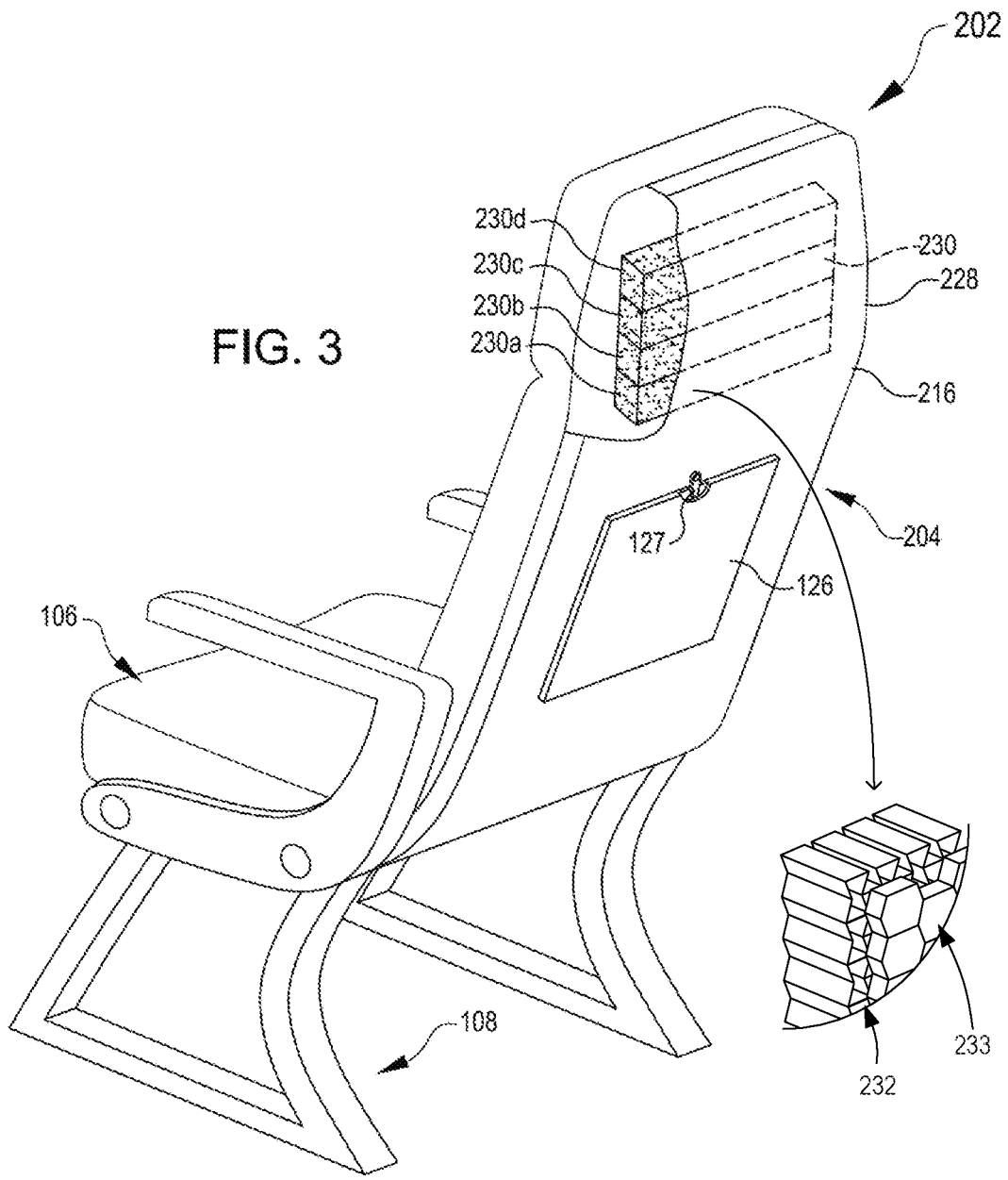
FIG. 3 is a simplified perspective view of a second example of a passenger seat having an alternative configuration of energy absorbing elements.

Different seating configurations can be adapted for use with auxetic energy absorbing elements in alternative configurations. For example, FIG. 3 is a simplified perspective view of a second example of a passenger seat 202 having an alternative configuration of an energy absorbing element 230 composed of multiple sub-elements 230a-d, whereby in the absence of a media device in the seat back 204, the energy absorbing element 230 can be positioned throughout an upper portion 228 of the seat back 204. Where space is available, any suitable number of auxetic energy absorbing sub-elements 230a-d can be installed for improving the reliability of the assembly at successfully capturing and arresting the forward movement of a passenger.

Embodiments described above can be positioned in a head path of a passenger seated aft of the passenger seat during a deceleration event. This positioning provides for absorbing impact energy in order to minimize the magnitude of deceleration of the head, thus improving performance with reference to established head-impact criteria (HIC). However, auxetic energy absorbing elements can be installed at other locations of a passenger seat, or multiple auxetic energy absorbing elements can be positioned throughout portions of a passenger seat for improving kinetic energy capture and reducing the likelihood of passenger injury.

The auxetic energy absorbing element 230, or any number of sub-elements 230a-d, can include one auxetic layer having an auxetic cell geometry (e.g., auxetic cell geometry 232), or may include multiple layers of elements stacked in the longitudinal direction with respect to the direction of energy capture. In some embodiments, additional layers can include one or more layers with a non-auxetic cell geometry 233, such as a hex grid or comparable structural grid. Non-auxetic layers may exhibit greater stiffness than auxetic layers, and can be used to spread the force of impact over one or more auxetic energy absorbing elements, can be used in combination with one or more auxetic layers to provide a stepped energy absorption profile, or can be positioned among auxetic energy absorbing elements to limit deformation of the auxetic energy absorbing elements at particular locations, such as over embedded hardware in the seat back 204.

Figure 4:
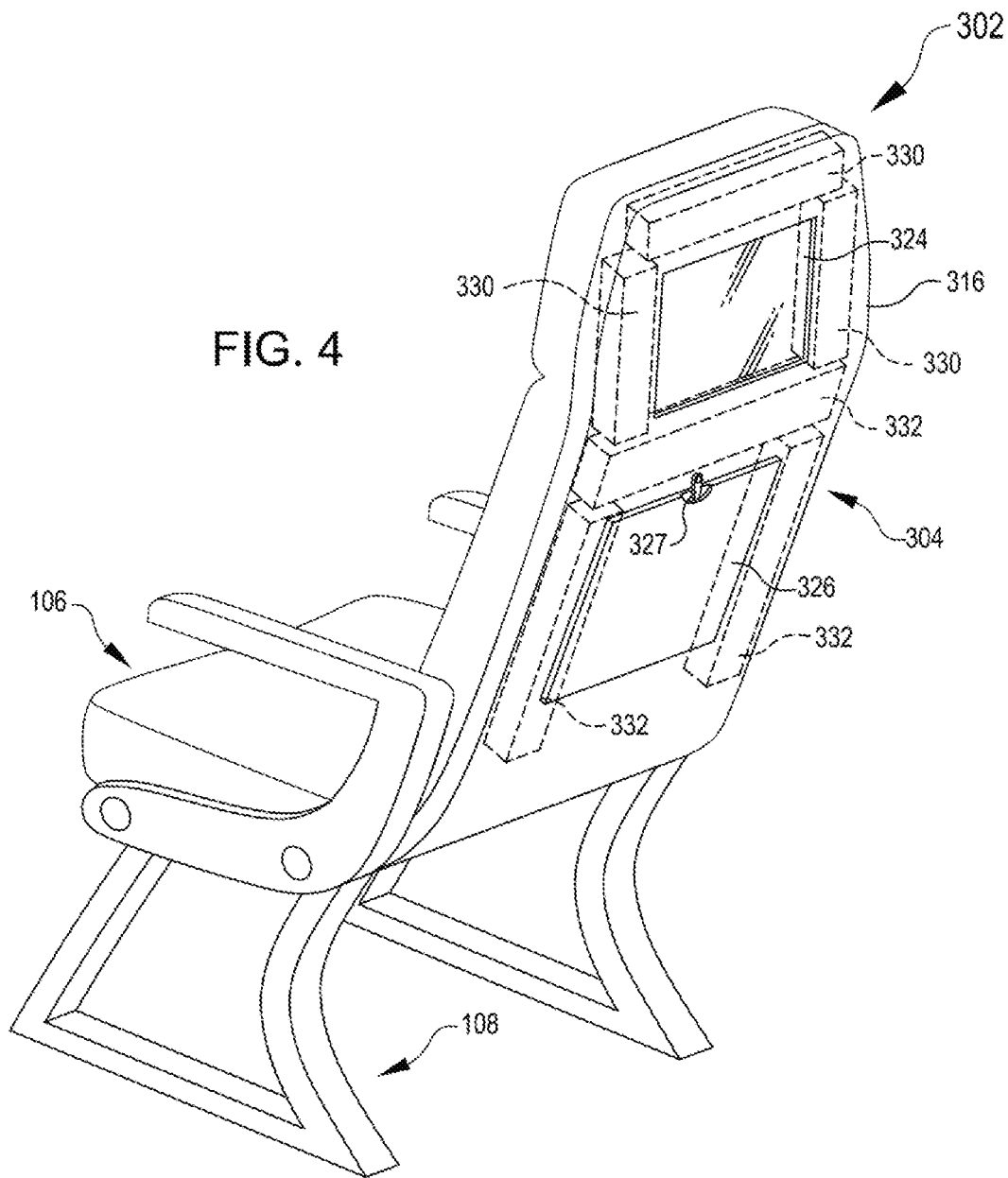
FIG. 4 is a simplified perspective view of a third example of a passenger seat, showing a variety of possible configurations of energy absorbing elements, in accordance with various embodiments.

FIG. 4 is a simplified perspective view of a third example of a passenger seat 302, showing a variety of possible configurations of auxetic energy absorbing elements 330, 332, in accordance with various embodiments. For example, according to some embodiments, a set of auxetic energy absorbing elements 330 can be positioned within the seat back shroud 316 and positioned throughout an upper portion thereof, surrounding an optional media device 324 and/or any other passenger amenities located in the seat back shroud. One or more additional auxetic energy absorbing elements 332 may be positioned throughout a lower portion, or a remainder of the seat back 304, surrounding an optional tray table 326 and locking mechanism 327. As discussed above with reference to auxetic energy absorbing element 130 (FIGS. 1-2), the auxetic energy absorbing elements 330, 332 can be encased within the seat back shroud 316, or may be encased in a pliable material and attached thereto.

The cellular structure of the auxetic energy absorbing elements (130, 230, 330) described above can include any suitable auxetic cell structure (i.e., a structure having a reentrant geometry that induces a negative Poisson's ratio when the structure is subject to deformation). In some embodiments, auxetic cell structures having alternative geometries can be used. In some embodiments, an auxetic foam can be used as an alternative to the extended two-dimensional grids described above. However, not all portions of an auxetic energy absorbing element need to have an auxetic cell structure throughout. For example, any of the auxetic energy absorbing elements described herein can be composed of multiple layers of energy absorbing material that include both auxetic and non-auxetic structures. Suitable non-auxetic layers can include, e.g., foam, or longitudinally extended grid structures having non-auxetic structures. Some grid structures that are not auxetic include, e.g., corrugated structures (i.e., repeating triangular lattices), hex grids, square grids, or any other suitable extended cellular structure having a cell structure with a non-auxetic geometry (i.e., positive Poisson's ratio).

Both extended auxetic structures and extended non-auxetic structures can absorb impact energy by crushing, with auxetic structures tending to pull inwards in responds to a crushing force and tending to absorb energy with greater efficiency that non-auxetic structures of comparable density. In contrast, non-auxetic energy absorbing elements may spread the force from an impact to a greater degree than auxetic energy absorbing elements. When used in combination, layered assemblies of auxetic and non-auxetic energy absorbing elements can selectively redirect kinetic energy, by the non-auxetic energy absorbing elements, into adjacent layers of auxetic energy absorbing elements, thus increasing overall efficiency at absorbing kinetic energy. In some embodiments, auxetic and non-auxetic energy absorbing elements can be layered sequentially in a longitudinal direction, with reference to the direction of energy capture. In some embodiments, auxetic and non-auxetic energy absorbing elements can be placed laterally with respect to each other in a direction of energy capture (i.e., side by side), either as separate elements or as contiguous regions of the same element. Examples of auxetic and non-auxetic energy absorbing element configurations are shown below with reference to FIGS. 5-8.

Figure 5:
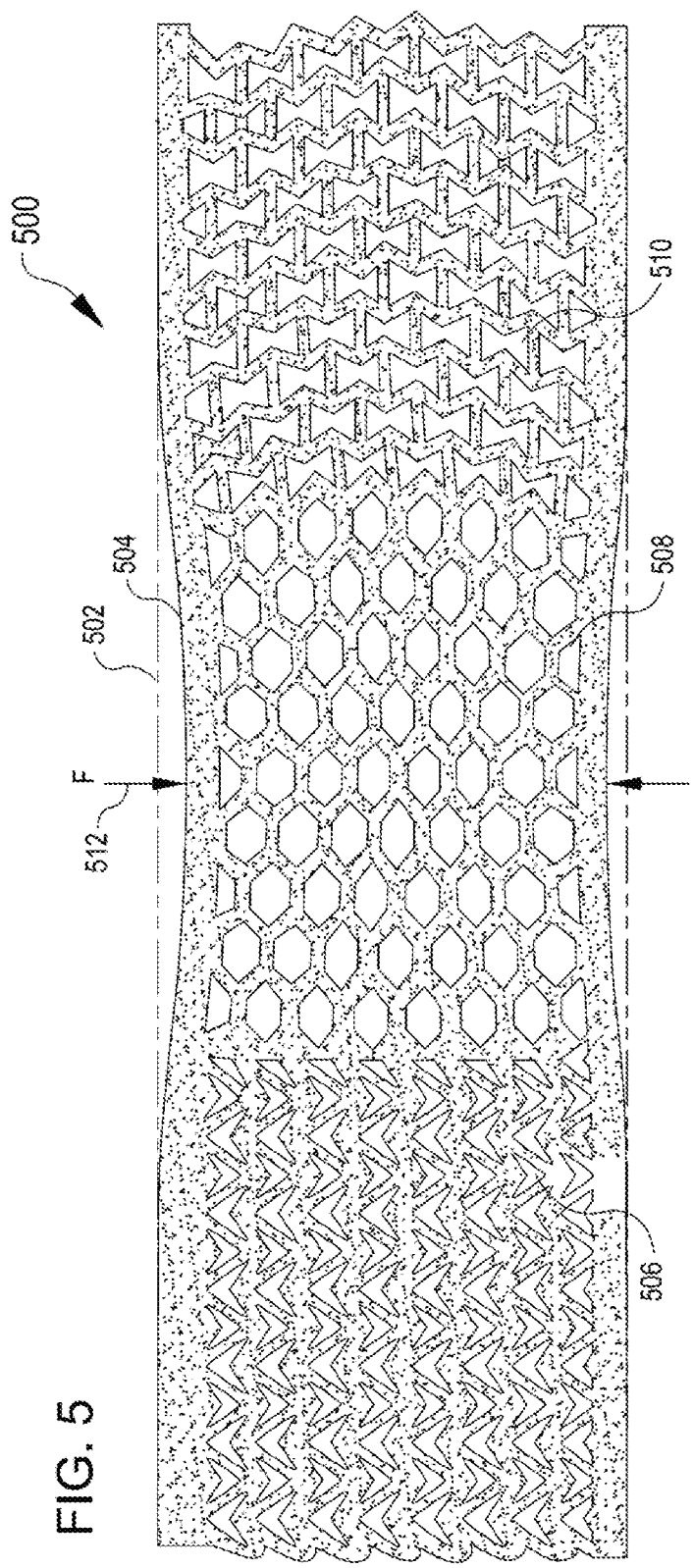
FIG. 5 is a simplified schematic of a first example of an auxetic energy absorbing element having multiple cell geometries, both auxetic and non-auxetic, laterally spaced with respect to each other, in accordance with various embodiments.

FIG. 5 is a simplified schematic of a first example of an auxetic energy absorbing element 500 having multiple cell geometries, both auxetic and non-auxetic, laterally spaced with respect to each other, in accordance with various embodiments. The energy absorbing element 500 deforms in response to a crushing force 512 applied vertically, tending to crush the energy absorbing element from an initial configuration 502 to a second configuration 504, in which the structure of the energy absorbing element has been deformed. A central portion of the energy absorbing element 500 can be a non-auxetic grid 508, in which compressive deformation tends to force the grid outwards along the sides. A second non-auxetic grid 506 adjacent the first non-auxetic grid resists outward deformation, whereas an adjacent auxetic grid 510 deforms readily, absorbing energy while deforming.

Figure 6:
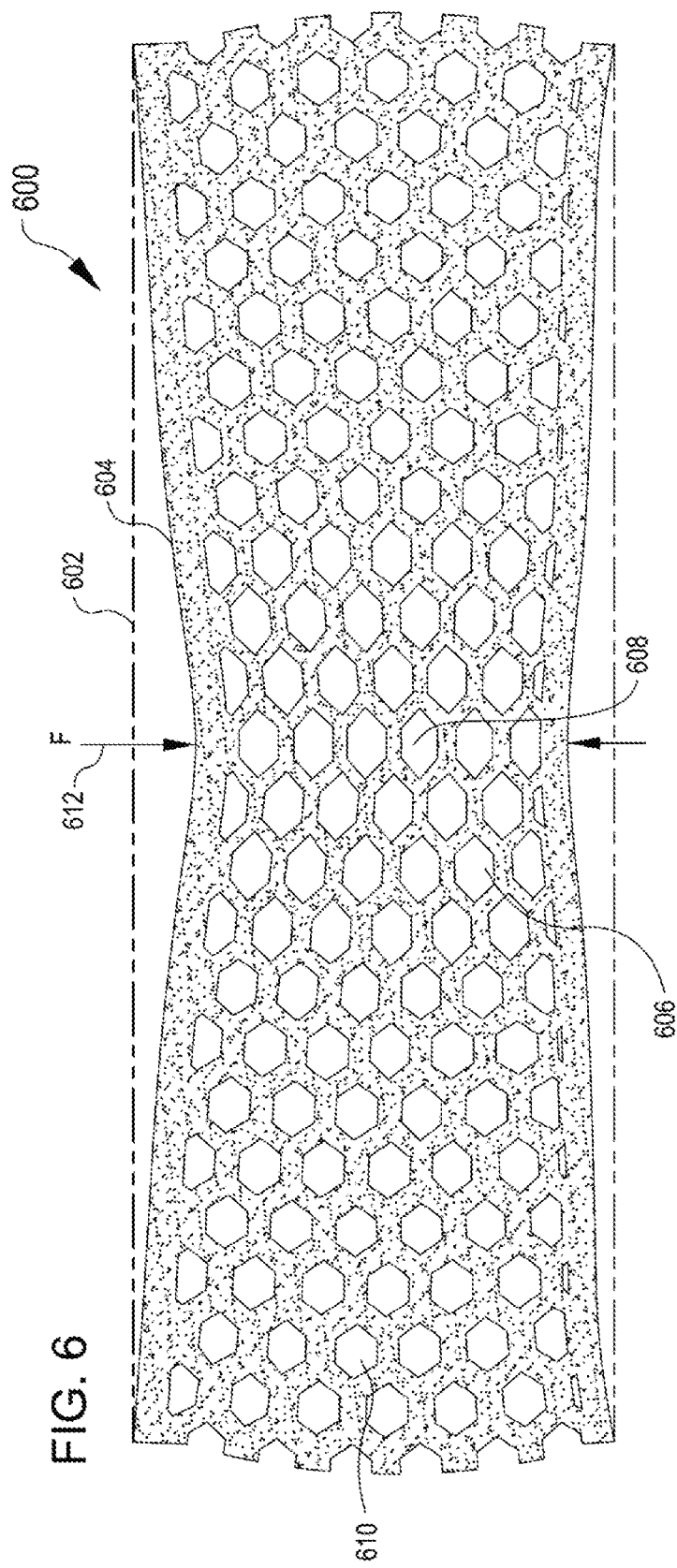
FIG. 6 is a simplified schematic of an example of non-auxetic energy absorbing element having a hexagonal cell structure and cell dimensions that change with lateral distance from an element center.

FIG. 6 is a simplified schematic of an example of non-auxetic energy absorbing element 600 having a hexagonal cell structure and cell dimensions that change with lateral distance from an element center. The energy absorbing element 600 deforms in response to a crushing force 612 applied vertically, tending to crush the energy absorbing element from an initial configuration 602 to a second configuration 604, in which the structure of the energy absorbing element has been deformed. A central portion of the energy absorbing element 600 is a non-auxetic grid 608 having thin sidewalls and a hex-grid structure 606, bordered on both sides by regions of increasing cell sidewall thickness 610. The crushing force 612 propagates laterally in the body of the energy absorbing element 600, causing deformation and lateral expansion across the length of the energy absorbing element.

Figure 7:
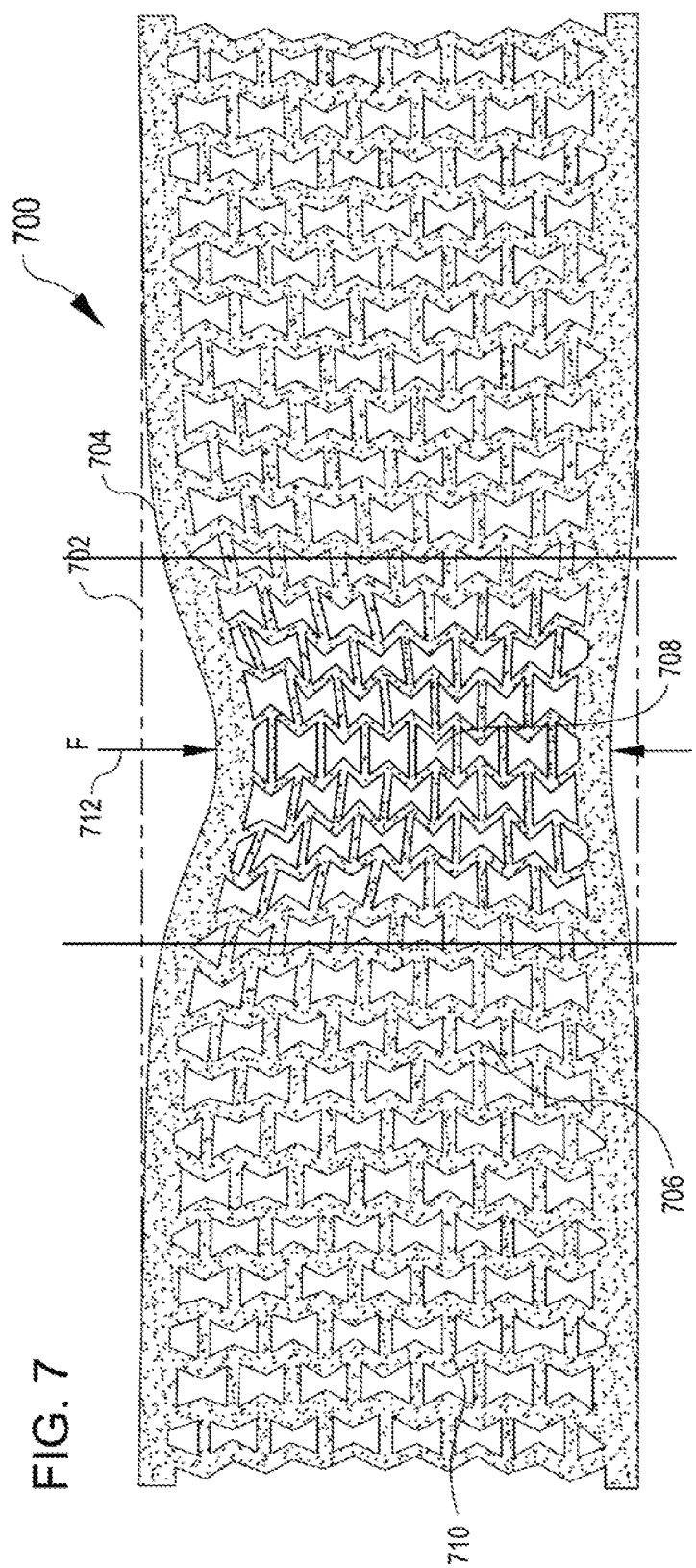
FIG. 7 is a simplified schematic of an example of an auxetic energy absorbing element having a bowtie-shaped concave hexagonal parallelagon cell structure and cell dimensions that change with lateral distance from an element center.

FIG. 7 is a simplified schematic of an example of an auxetic energy absorbing element 700 having a bowtie-shaped concave hexagonal parallelagon cell structure 706 and cell dimensions that change with lateral distance from an element center. The energy absorbing element 700 deforms in response to a crushing force 712 applied vertically, tending to crush the energy absorbing element from an initial configuration 702 to a second configuration 704, in which the structure of the energy absorbing element has been deformed. A central portion of the energy absorbing element 700 is an auxetic grid 708 having thin sidewalls and a bowtie-shaped concave hexagonal parallelagon cell structure 706, bordered on both sides by regions of increasing cell sidewall thickness 710. The crushing force 712 propagates laterally in the body of the energy absorbing element 700, causing deformation and lateral contraction, rather than expansion, across the length of the energy absorbing element. In contrast to the non-auxetic example structure of FIG. 6, the auxetic energy absorbing element 700 has a greater vertical displacement over a smaller lateral area, which is indicative of a longer stopping distance while absorbing energy. In addition, the tendency of the auxetic energy absorbing element 700 to contract inward causes the energy absorbing element to recruit more material while it deforms, resulting in an energy capture rate that advantageously increases with the degree of deformation.

Extended auxetic cell structures as embodied in the auxetic energy absorbing elements described herein can, under some conditions, dissipate up to fifteen times more impact energy than conventional foams, and up six times more impact energy than high-density foams. With comparison to comparably dense cellular cores (e.g., grid-formed cores having geometries like that shown above with reference to FIG. 7), auxetic energy absorbing elements (e.g. as shown in FIG. 8) can absorb up to 33% more impact energy.

Figure 8:
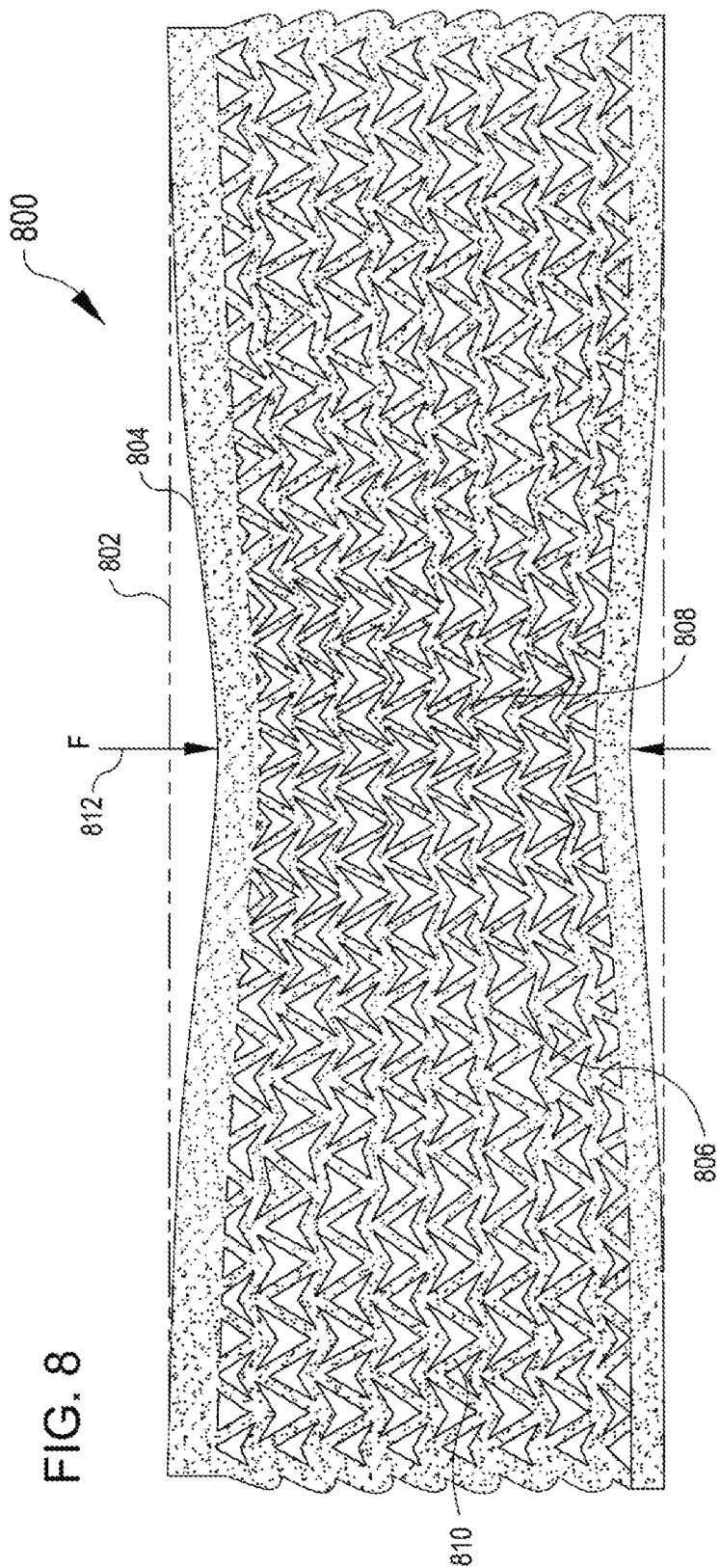
FIG. 8 is a simplified schematic of second example of a non-auxetic energy absorbing element having a repeating triangular cell structure.

FIG. 8 is a simplified schematic of second example of another non-auxetic energy absorbing element 800 having a repeating triangular cell structure. The energy absorbing element 800 deforms in response to a crushing force 812 applied vertically, tending to crush the energy absorbing element from an initial configuration 802 to a second configuration 804, in which the structure of the energy absorbing element has been deformed. A central portion of the energy absorbing element 800 is a non-auxetic grid 808 having thin sidewalls and a triangular-grid structure 806, bordered on both sides by regions of increasing cell sidewall thickness 810. The crushing force 812 propagates laterally in the body of the energy absorbing element 800, causing deformation and lateral expansion across the length of the energy absorbing element, like the deformation associated with non-auxetic energy absorbing element 600 (FIG. 6) described above.

FIG. 9 illustrates an example process 900 for installing an auxetic energy absorbing element in a passenger seat, in accordance with various embodiments. First, a projected impact region of a passenger seat back can be determined (act 902), e.g., by way of suitable computer numerical simulation or other computer tool. An auxetic energy absorbing element can then be attached to the passenger seat within the projected impact region (act 904). This attachment can include first removing a shroud or covering from the passenger seat and then placing the auxetic energy absorbing element within the seat back, or against a seat back frame or portion thereof. Suitable locations for attaching the auxetic energy absorbing element are described above with reference to FIGS. 1-4, but can include generally any position on the seat back, including adjacent a media device or tray table, within an aft portion of a headrest, or along the sides of the passenger seat. According to some embodiments, one or more additional, non-auxetic energy absorbing elements can be connected with the seat back in conjunction with the auxetic energy absorbing element (act 906).

Non-auxetic energy absorbing elements may be used to absorb impact energy while redirecting some impact energy through the non-auxetic energy absorbing elements and to the auxetic energy absorbing element. In some embodiments, non-auxetic energy absorbing elements can be layered sequentially or longitudinally with respect to the direction of energy capture, such that the non-auxetic energy absorbing element(s) provide an additional layer of structure either underlying or spreading force across the auxetic energy absorbing element. In some embodiments, non-auxetic energy absorbing elements can be placed alongside or lateral to the auxetic energy absorbing element(s), either to transfer energy laterally or to redirect an impact toward the auxetic energy absorbing element. Any attached auxetic energy absorbing elements and non-auxetic energy absorbing elements may be concealed within a passenger seat back by enclosing the energy absorbing elements within a seat back cover or shroud (act 908).

The process 900 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, aspects of process 900 may be performed manually.

In the following, further examples are described to facilitate the understanding of the invention:

Example A. An energy absorbing assembly for a passenger seat, the energy absorbing assembly comprising:
    an energy absorbing element connectible with a first passenger seat and configured for placement forward of a second passenger seat positioned aft of the first passenger seat, the energy absorbing element comprising a crushable matrix comprising a plurality of cells having an auxetic cell geometry that are crushable in a direction of energy capture.

Example B. The energy absorbing assembly of example A, wherein the energy absorbing element is connected to a seat back of the first passenger seat.

Example C. The energy absorbing assembly of example B, wherein the seat back of the first passenger seat further comprises a seat back cover connected with the seat back and enclosing the energy absorbing element.

Example D. The energy absorbing assembly of any one of the preceding examples, wherein:
the crushable matrix comprises a three-dimensional grid comprising cavities defined by the auxetic cell geometry that extend in the direction of energy capture; and
the auxetic cell geometry is expressed in a two-dimensional plane orthogonal to the direction of energy capture.

Example E. The energy absorbing assembly of any one of the preceding examples, wherein the energy absorbing element comprises a sandwich panel comprising first and second surfaces separated by the crushable matrix.

Example F. The energy absorbing assembly of any one of the preceding examples, wherein the auxetic cell geometry of the plurality of cells comprises a repeating array of reentrant bowtie-shaped cells.

Example G. The energy absorbing assembly of any one of examples A-C, wherein the energy absorbing element comprises an auxetic foam.

Example H. The energy absorbing assembly of any one of the preceding examples, wherein the energy absorbing element comprises a thermoplastic polymer or polymer composite.

Example I. The energy absorbing assembly of any one of the preceding examples, wherein the energy absorbing element comprises a first region comprising a first cell geometry and having a first stiffness, and a second region comprising a second cell geometry and having a second stiffness that is different than the first stiffness, the second region positioned laterally with respect to the first region and with reference to the direction of energy capture.

Example J. The energy absorbing assembly of any one of the preceding examples, wherein the energy absorbing element comprises a first stage comprising a first cell geometry and having a first stiffness, and a second stage comprising a second cell geometry and having a second stiffness that is different than the first stiffness, the second stage aligned longitudinally with the first stage with reference to the direction of energy capture.

Example K. The energy absorbing assembly of example I or example J, wherein the first cell geometry is the auxetic cell geometry, and the second cell geometry is a non-auxetic cell geometry.

Example L. The energy absorbing assembly of any one of the preceding examples, wherein the plurality of cells defined by the auxetic cell geometry comprise a cell size ranging from 1-10 mm, preferably 5-10 mm.

Example M. A passenger seat, comprising:
a frame;
a seat back connected with the frame; and
an energy absorbing element connected with and positioned aft of the seat back, the energy absorbing element comprising a crushable matrix comprising a plurality of cells having an auxetic cell geometry that are crushable in a direction of energy capture.

Example N. The passenger seat of example M, wherein the plurality of cells comprises a repeating array of cavities that extend in the direction of energy capture.

Example O. The passenger seat of any one of the preceding examples, wherein the energy absorbing element is connected with the seat back in a position aligned with a projected impact region corresponding to a location at which a passenger located behind the passenger seat may contact the seat back during a severe impact event.

Example P. The passenger seat of any one of the preceding examples, wherein:
the seat back comprises a multimedia device; and
the energy absorbing element is connected with the seat back adjacent to the multimedia device.

Example Q. The passenger seat of any one of the preceding examples, further comprising a plurality of energy absorbing elements, including the energy absorbing element, connected with the seat back.

Example R. The passenger seat of any one of the preceding examples, further comprising a seat back cover connected with the seat back and enclosing the energy absorbing element.

Example S. A method of installing an energy absorbing assembly in a passenger seat, the method comprising:
connecting an energy absorbing element with a seat back of the passenger seat at a position aligned with a projected impact region, the energy absorbing element comprising a crushable matrix comprising a plurality of cells having an auxetic geometry, and the projected impact region comprising a portion of the seat back at which a passenger located behind the passenger seat would be expected to contact the seat back during a severe deceleration event.

Example T. The method of example 19, further comprising: enclosing the energy absorbing element by mounting a seat back covering to the seat back after connecting the energy absorbing element to the seat back.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat, comprising:
a seat bottom; and
a seat back connected to the seat bottom, wherein a forward side of the seat back and the seat bottom define a seating surface for supporting passenger, the seat back comprising a seat back shroud on an aft side of the seat back and enclosing the aft side of the seat back, and a tray table supported on the seat back shroud, the tray table movable between a stowed position and a deployed position; and
an energy absorbing element on the aft side of the seat back and positioned within the seat back shroud or on an aft-facing surface of the seat back shroud, the energy absorbing element vertically above and vertically adjacent the tray table when the tray table is in the stowed position, the energy absorbing element comprising:
a crushable matrix comprising:
a plurality of cells having an auxetic cell geometry that are crushable in a direction of energy capture, wherein:

the crushable matrix comprises a three-dimensional grid comprising cavities defined by the auxetic cell geometry that extend in the direction of energy capture;

the auxetic cell geometry is expressed in a two-dimensional plane orthogonal to the direction of energy capture; and a non-auxetic layer coupled to the crushable matrix.

2. The passenger seat of claim 1, wherein the plurality of cells comprises a repeating array of cavities that extend in the direction of energy capture.

3. The passenger seat of claim 1, wherein the energy absorbing element is in a position aligned with a projected impact region corresponding to a location at which a passenger located behind the passenger seat may contact the seat back during a severe impact event.

4. The passenger seat of claim 1, wherein: the seat back comprises a multimedia device; and the energy absorbing element is connected with the seat back adjacent to the multimedia device.

5. The passenger seat of claim 4, wherein the energy absorbing element surrounds a perimeter of the multimedia device within the seat back, and the energy absorbing element is not present between an upper portion of the seat back and a bow facing surface of the multimedia device.

6. The passenger seat of claim 1, further comprising a plurality of energy absorbing elements, including the energy absorbing element, connected with the seat back.

7. The passenger seat of claim 1, further comprising a seat back cover connected with the seat back and enclosing the energy absorbing element.

8. The passenger seat of claim 1, wherein the auxetic cell geometry of the plurality of cells comprises a repeating array of reentrant bowtie-shaped cells.

9. The passenger seat of claim 1, wherein the energy absorbing element comprises an auxetic foam.

10. The passenger seat of claim 1, wherein the energy absorbing element comprises a thermoplastic polymer or polymer composite.

11. The passenger seat of claim 1, wherein the energy absorbing element comprises a first region comprising a first cell geometry and having a first stiffness, and a second region comprising a second cell geometry and having a second stiffness that is different than the first stiffness, the second region positioned laterally with respect to the first region and with reference to the direction of energy capture.

12. The passenger seat of claim 1, wherein the energy absorbing element comprises a first stage comprising a first cell geometry and having a first stiffness, and a second stage comprising a second cell geometry and having a second stiffness that is different than the first stiffness, the second stage aligned longitudinally with the first stage with reference to the direction of energy capture.

13. The passenger seat of claim 12, wherein the first cell geometry is the auxetic cell geometry, and the second cell geometry is a non-auxetic cell geometry.

14. The passenger seat of claim 1, wherein the plurality of cells defined by the auxetic cell geometry comprise a cell size ranging from 1-10 mm.

15. The passenger seat of claim 1, wherein the energy absorbing element is below a headrest region of the seat back.

16. The passenger seat of claim 1, wherein the seat back further comprises a seat back cushion on a forward side of the seat back and a seat back inner frame.

17. The passenger seat of claim 1, further comprising a frame in contact with a floor configured to support the seat bottom and the seat back, wherein a vertical distance between the floor and the energy absorbing element is in a range of 75 to 90 cm.

18. The passenger seat of claim 1, wherein the non-auxetic layer has a greater stiffness than the crushable matrix.

19. The passenger seat of claim 1, wherein the crushable matrix is positioned within a cladding and the non-auxetic layer is not positioned within the cladding.

20. The passenger seat of claim 1, wherein the non-auxetic layer is layered sequentially.

* * * * *